United States Patent [19]

Aber et al.

[11] 3,957,617
[45] May 18, 1976

[54] WATER TREATMENT DEVICE WITH TRANSISTORIZED CIRCUIT

[75] Inventors: Henry S. Aber, Cleveland; Dean D. Riggs, Avon Lake; John Lamantia, Lakewood, all of Ohio

[73] Assignee: Water Technology Service, Inc., Cleveland, Ohio

[22] Filed: May 22, 1975

[21] Appl. No.: 579,771

Related U.S. Application Data

[62] Division of Ser. No. 356,600, May 2, 1973, Pat. No. 3,899,410.

[52] U.S. Cl. .................................. 204/305; 204/228
[51] Int. Cl.² .................................... B01D 13/02
[58] Field of Search ................................ 204/302–308, 204/228, 149–152, 186

[56] References Cited
UNITED STATES PATENTS

| | | |
|---|---|---|
| 2,727,859 | 12/1955 | Freeborn ........................... 204/305 |
| 3,738,927 | 6/1973 | Miller ................................ 204/228 |
| 3,758,399 | 9/1973 | Pendergrass ....................... 204/228 |
| 3,865,710 | 2/1975 | Phipps .............................. 204/228 |

Primary Examiner—T. M. Tufariello
Attorney, Agent, or Firm—Donnelly, Maky, Renner & Otto

[57] ABSTRACT

An electrical liquid treatment apparatus for eliminating and preventing hardness effects includes an enlarged fitting adapted for coupling in a flow line and a screen insulatively supported in the fitting with an electric potential applied between the screen and the fitting, and a cleaning device having sharp edges is positioned in the fitting to clean mineral and other deposits from the screen.

3 Claims, 6 Drawing Figures

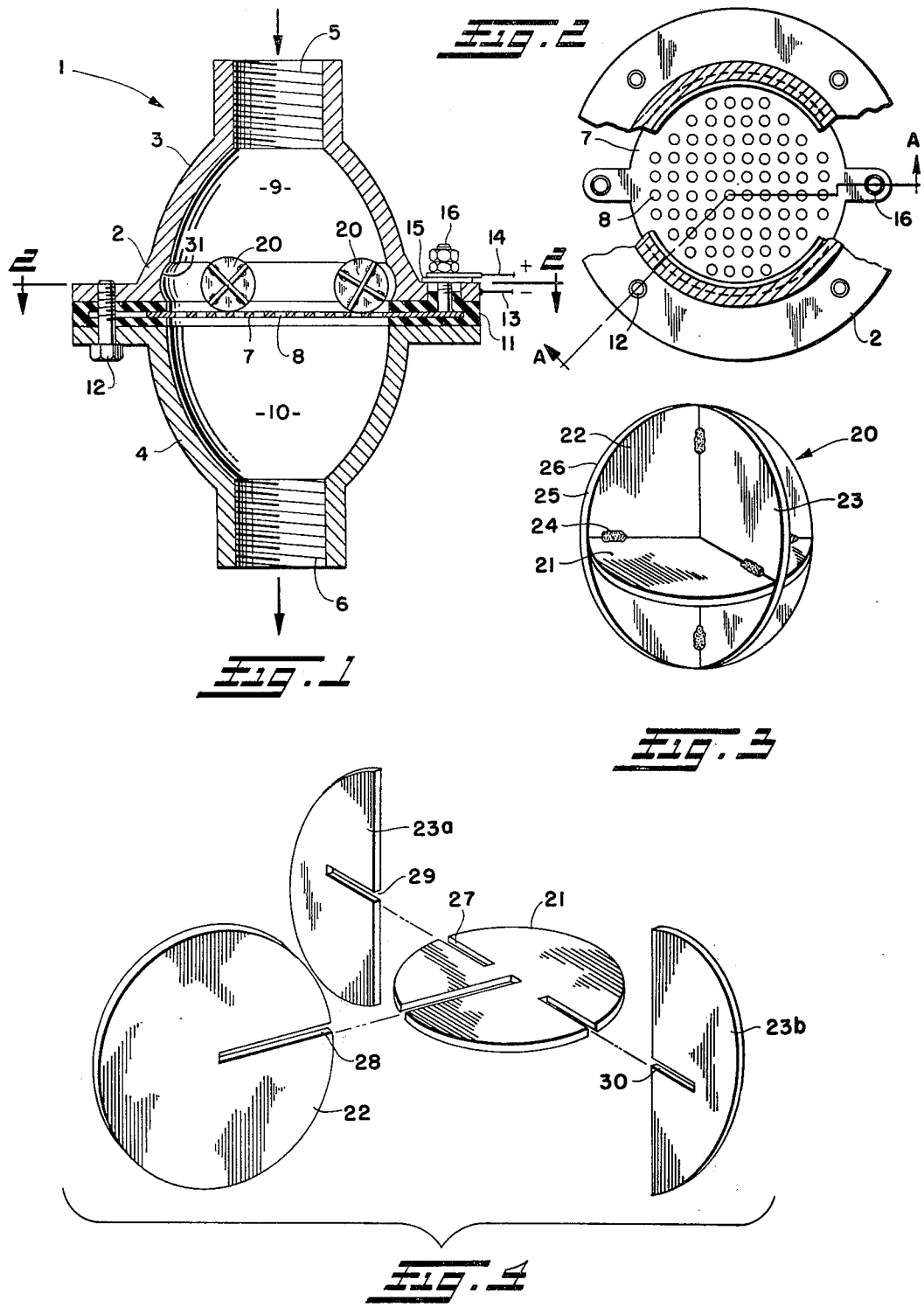

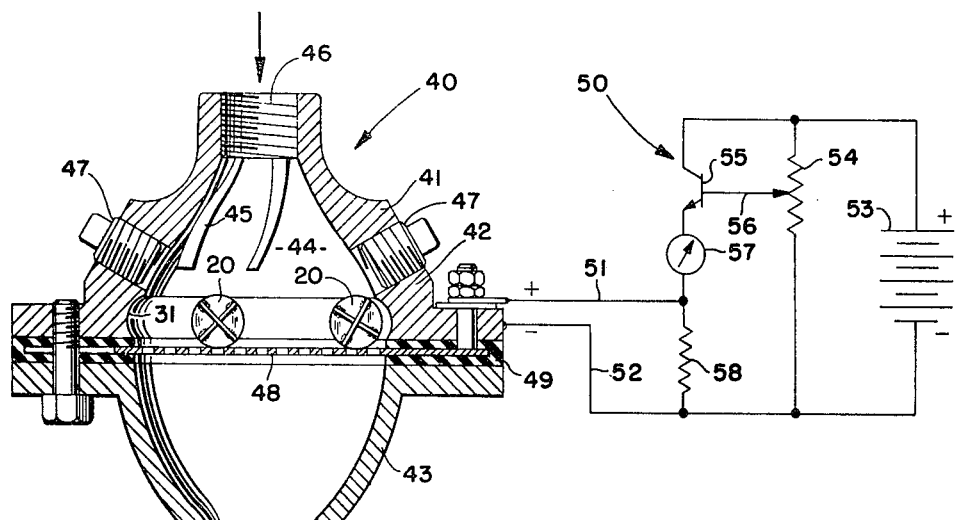
_Fig.5_
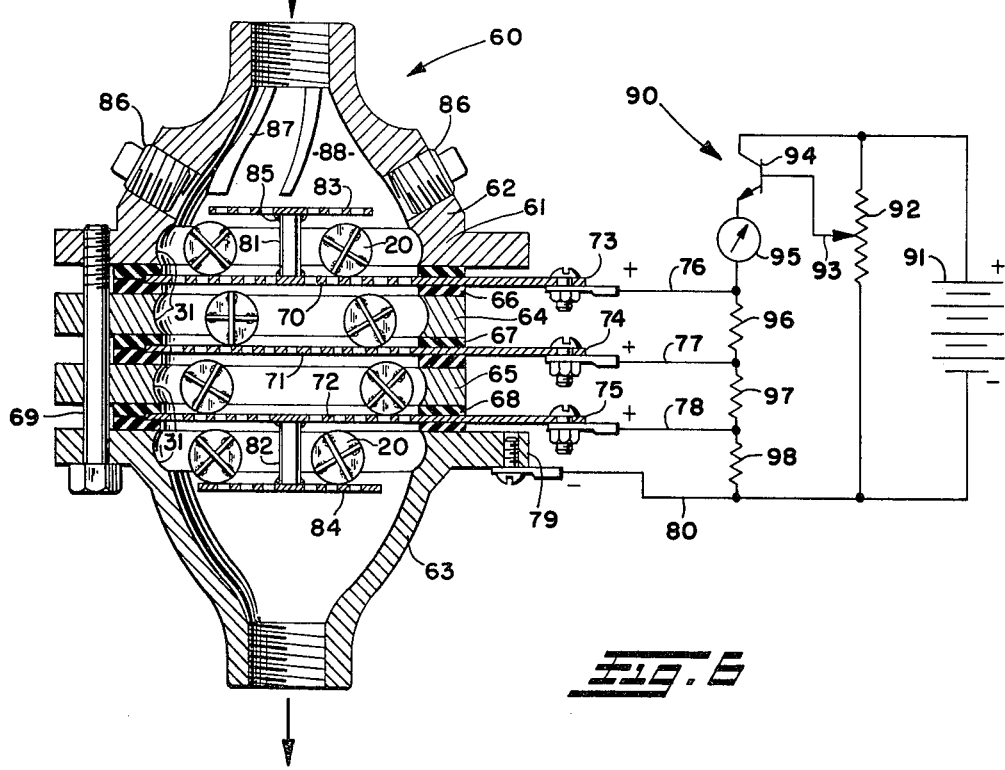
_Fig.6_

WATER TREATMENT DEVICE WITH TRANSISTORIZED CIRCUIT

This is a division of application Ser. No. 356,600, filed May 2, 1973, now U.S. Pat. No. 3,899,410.

BACKGROUND OF THE INVENTION

This invention relates to apparatus for treating liquids to reduce the effects of hardness and to a cleaning device and excitation circuit therefore.

Water hardness has usually been eliminated, in the past, by a chemical process which withdraws from the water the particular hardness causing impurities. Electrical water treatment devices, such as that described in U.S. Pat. No. 2,729,859 have also been used to eliminate water hardness effects by passing the water through an electric field established by an electrically conductive fitting and an electrically conductive screen insulatively supported therein. A voltage potential applied across the housing and screen establishes the electric field. One problem with such prior art electrical water treatment devices is the accumulation of scale and other mineral deposits on the screen, which restricts water flow through the openings therein and reduces the electric field by providing an insulating coating on the screen.

Accumulated mineral deposits in a fluid system, for example in hot water tanks, boilers, water towers, air conditioners, humidifiers, dishwashers, spray nozzles, etc. are often difficult to remove, sometimes requiring an acid treatment for effective removal. Conventional water softening chemicals and ion exchange treatments, while removing the hardness causing minerals from the water, do not eliminate those minerals already deposited and accumulated in the water system.

SUMMARY OF THE INVENTION

Accordingly, a primary object of the invention is to provide an efficient apparatus for treating liquid to eliminate hardness effects.

Another object of the invention is to provide an apparatus for treating liquid to prevent scale and other mineral formation in liquid systems.

An additional object of the invention is to provide an apparatus for eliminating scale and other deposits accumulated in a liquid system.

A further object of the invention is to provide an apparatus for eliminating and preventing mineral deposits in a liquid treatment apparatus.

Still another object of the invention is to provide an efficient, long lasting, excitation power source for an electrical liquid treatment apparatus.

Still an additional object of the invention is to provide an apparatus for efficiently eliminating and preventing deposits in a fluid treatment apparatus.

These and other objects and advantages of the invention will become more apparent as the present description proceeds.

To the accomplishment of the foregoing and related ends, the invention, then, comprises the features hereinafter fully described, the following description and the annexed drawings setting forth in detail certain illustrative embodiments of the invention, these being indicative, however, of but several of the various ways in which the principals of the invention may be employed.

BRIEF DESCRIPTION OF THE DRAWINGS

In the annexed drawings:

FIG. 1 is a section view of an electrical liquid water treatment apparatus with an internal cleaning device;

FIG. 2 is a plan view partially broken away of the electrical liquid treatment apparatus of FIG. 1 taken along the line 2—2;

FIG. 3 is an isometric view of a cleaning device;

FIG. 4 is an exploded isometric view of the cleaning device of FIG. 2;

FIG. 5 is a section view of a modified electrical liquid treatment apparatus with an excitation circuit; and FIG. 6 is a section view of another modified electrical liquid treatment apparatus and excitation circuit therefor.

DESCRIPTION OF THE PREFERRED EMBODIMENT

In referring to the drawings below, the electrical liquid treatment apparatus will be described for use in eliminating the hardness effects of water, although such apparatus may be used for treatment of other liquids. Also, the cleaning device described below for use in an electrical water treatment apparatus may be used in other apparatus for removing undesirable mineral and other deposits from surfaces.

Turning now to the drawings wherein like reference numerals refer to like elements in the several figures, an electrical water treatment apparatus is shown generally at 1 in FIG. 1, this figure being taken on the section line A—A of FIG. 2. The electrical water treatment apparatus includes a football-shape fitting 2 defined by upper and lower bell-shape housings or casings 3, 4, which are electrically conductive and have respective inlet and outlet passages 5, 6 for coupling the fitting in a flow line. An electrically conductive screen 7 having openings 8 therein is positioned between the upper and lower bell-shape casings 3, 4 to define in the fitting inlet and outlet fluid chambers 9, 10. The screen 7 is shown in more detail in FIG. 2. In the preferred embodiment the fitting 1 may be, for example, brass and the screen 7 may be, for example, stainless steel plate.

An electrically insulating gasket 11, such as for example rubber, separates the upper and lower bell-shape casings 3, 4 from the screen 7 while providing a fluid tight connection between the casings under the influence of a plurality of fasteners 12. Such fasteners are preferably electrically conductive to provide an electrical connection between the upper and lower casings 3, 4.

A negative lead 13 is fixed to the fitting 1, such as for example by welding a contact thereto, and a positive lead 14 insulated from the fitting by an insulator 15 is coupled to a tab forming a terminal 16 which extends from the screen 7.

Within the inlet fluid chamber 9 are positioned a plurality of cleaning devices 20, each of which has a plurality of scraping edges and surfaces for eliminating mineral and other deposits from the screen 7 as well as from the interior wall surfaces of the upper bell-shape casing 3. The cleaning device 20 is shown in greater detail in FIG. 3 in which first, second, and third planar sides 21, 22, 23, are fastened together, for example, by welds 24. Each of the planar sides has a round cross-section, and the edges 25 of such planar sides preferably have sharp corners 26 to facilitate the removal of deposits from the screen 7 and the walls of the upper bell-shape casing 3.

As shown in FIG. 4, the first planar side 21 of the cleaning device 20 is formed of a flat disc having a circular cross-section and a plurality of slots 27 defined therein. The second planar side 22 has a single slot 28 for mating with the corresponding one of the slots 27 formed in the first planar side 21; and the third planar side 23 defined by first and second halves 23a, 23b has respective slots 29, 30 formed therein for mating with corresponding ones of the slots 27 in the first planar side 21. Although the cleaning device 20 as illustrated has round sides defining a spherical shape, the size and shape may be varied to define a square, cube, brush, or other shape, which will move within the inlet fluid chamber 9 as the water flows therethrough to scrape mineral and other deposits from the screen 7 and the walls of the upper bell-shape casing 3. The cleaning device 20 may be of strong metal or of plastic plated with a nickel and chromium mixture for strength and durability and may have a plurality of planar surfaces fastened together or may be formed as a single piece, for example, in a die.

In operation of the water treatment apparatus 1, an electric potential is applied to the positive and negative leads 14, 13 to achieve a potential difference between the screen 7 and the fitting 2, which establishes an electric field therebetween. Although it is not clear what effect this electric field has on the water flowing through the fitting 2, it has been found that the mineral and other deposits formed within the downstream water system, such as for example in a boiler, tend to break up and are flushed away. Also, no further mineral or other similar deposits build up in the water system as long as the water flowing therethrough and used therein is passed through the energized fitting 2.

It has been found, however, that a certain amount of mineral accumulation occurs within the fitting 2 and particularly on the screen 7, which mineral accumulation tends to restrict water flow through the openings 8 and to produce an electrically non-conductive coating on the screen. The cleaning devices 20, however, under the influence of water flow through the inlet chamber 9 are jostled throughout the upper bell-shape casing 3, against the screen 7 and the plural sides 21, 22, 23, edges 25, and sharp corners 26 thereof clean any mineral accumulations from the screen as well as from the interior wall of the upper bell-shaped casing. Preferably the upper bell-shape casing 3 has a relief portion 31 about the inner circumference thereof to facilitate cleaning the entire screen by the cleaning devices.

Referring now more specifically to FIG. 5, a modified electrical water treatment apparatus 40 is shown including a fitting 41 having upper and lower bell-shape casings or housings 42, 43. The upper bell-shape casing 42 defines the inlet chamber 44, and a plurality of curved vanes 45 are formed in the upper bell-shape casing near the inlet passage 46 of the fitting 41 to develop turbulence in the water flowing into the inlet chamber. Clean out ports 47 formed in the upper bell-shape casing 42 and if desired in the lower bell-shape casing permit viewing into the interior of the fitting as well as the cleaning thereof. The screen 48, gasket 49, and cleaning devices 20 are similar to those described above.

An excitation electric circuit 50 for providing an excitation voltage on the positive and negative leads 51, 52 of the fitting 41 includes a voltage source 53, such as for example a battery, with a potentiometer 54 connected across the positive and negative terminals thereof. An NPN transistor 55, connected in an emitter-follower configuration, has its base connected to the adjustable wiper arm 56 of the potentiometer 54. The collector of the transistor 55 is connected to the positive terminal of the battery, and the emitter thereof is connected through a meter 57, such as for example a milliameter, and a resistor 58 to the negative terminal of the voltage source 53. The positive and negative leads 51, 52 from the fitting are connected across the resistor 58.

In operation of the electrical water treatment apparatus shown in FIG. 5 the electric excitation circuit 50 is connected to provide a constant voltage potential between the positive and negative leads 51, 52. By adjusting the wiper arm 56 of the potentiometer 54 the current flow through the transistor 55 may be controlled to establish the voltage drop across the resistor 58 for application to such leads. It has been found that a current flow of 1 milliamp and a voltage drop of 5 millivolts is effective although other currents and voltages may be used. The vanes 45, which may be, for example, formed in the upper bell-shape casing 42 when the latter is cast or otherwise manufactured, cause the water to swirl in the inlet chamber 44. The swirling causes increased jostling of the cleaning devices 20 that clean and scrape the screen 48 to avoid any mineral accumulation thereon and on the interior wall of the upper bell-shape casing 42. The electric field established between the screen 48 and the electrically conductive fitting 41 affects the water flowing through the fitting, as described above, to eliminate any mineral and other deposits already accumulated in the downstream water system and to prevent further accumulation thereof.

Turning now to FIG. 6, a further modified electrical water treatment apparatus 60 defined by a fitting 61 is shown. The fitting 61 has an upper and lower bell-shape housings or casings 62, 63 with electrically conductive spacer members 64, 65 and electrically insulating gaskets 66, 67, 68 positioned therebetween. A plurality of fasteners 69, such as for example bolts, connect the upper and lower bell-shape casings 62, 63 and the spacers 64, 65 together both physically and electrically so that all of same are at the same electric potential and define a water tight fitting. Respective first, second, and third screens 70, 71, 72, each having a plurality of openings, are positioned in the fitting between respective gaskets 66, 67, 68 and have respective electric terminal extensions 73, 74, 75 to which respective leads 76, 77, 78 are connected. A further terminal 79 connects the negative lead 80 to the lower bell-shape casing 63 of the fitting 61.

The first and third screens, 70, 72 include respective electrically conductive support pedestals 81, 82 to which respective supplemental screens 83, 84 are fastened, for example by welds 85, and a plurality of cleaning devices 20 are positioned between the respective screens and supplemental screens. Clean out ports 86 formed in the upper bell-shape casing 62 and if desired in the lower bell-shape casing 63 permit viewing and cleaning same, and a plurality of vanes 87, as described above, are formed in the inlet fluid chamber 88 in the upper bell-shape casing.

The electric excitation circuit 90 for providing excitation voltage to the electrical water treatment apparatus 60 includes a power supply 81, such as for example a battery, across which a pontentiometer 92 is connected. The adjustable wiper arm 93 of the potentiometer 92 is connected to the base of an NPN transistor 94, which has its collector connected to the positive terminal of the battery. The emitter of the transistor 94 is connected through a meter 95, such as for example a miliameter, and through respective series connected resistors 96, 97, 98, to the negative terminal of the battery. The leads 76, 77, 78 to the three screens 70, 71, 72 are connected to the respective positive sides of the resistors 96, 97, 98 and the negative lead 80 to which the fitting 61 is connected is coupled to the negative terminal of the battery.

In operation of the electrical water treatment apparatus shown in FIG. 6, water flows through the inlet passage and swirls in the inlet fluid chamber 88 due to the action of the vanes 87. The electric potential applied between respective screens as well as between respective screens and the respective upper and lower bell-shape casings 62, 63, and spaces 64, 65 affects the water as described above to eliminate the hardness effects downstream, while the cleaning devices 20 maintain the screens themselves and the proximate interior walls of the fitting 61 in mineral free condition. In one application, it has been found that using five ohm resistors with a one milliamp current therethrough, the above discussed effects of water hardness are eliminated and prevented.

The embodiments of the invention in which an exclusive property is claimed are defined as follows:

1. A fluid treatment apparatus comprising a fitting having inlet and outlet passages for coupling in a flow line, said fitting defining an electrically conductive bell-shape housing having inlet and outlet chambers and a perforated electrically conductive screen insulatively supported between said chambers for separating the same, means for applying an electric potential between said electrically conductive bell-shape housing and said perforated electrically conductive screen, said means for applying an electric potential comprising energy storage means for providing a source of said electric potential, said energy storage means having first and second terminals, a potentiometer coupled across said first and second terminals, said potentiometer having an adjustable output terminal, a series circuit including a transistor, meter, and resistor means coupled across said first and second terminals, said transistor having a base coupled to said adjustable output terminal of said potentiometer, and means for coupling opposite sides of said resistor means respectively to said perforated electrically conductive screen and said electrically conductive bell-shape housing.

2. A fluid treatment device as set forth in claim 1, further comprising means for extending the effective length of said bell-shape housing including electrically conductive spacer means for defining with said bell-shape housing an elongated bell-shape housing, and further perforated electrically conductive screens insulatively supported in said elongated bell-shape housing to define intermediate chambers between said inlet and outlet chambers.

3. A fluid treatment device as set forth in claim 2, wherein said resistor means comprise a plurality of resistors, means for coupling each of said plurality of resistors to respective perforated electrically conductive screens with the perforated screen closest to said inlet chamber receiving the maximum potential and the perforated screen closest the outlet chamber receiving the lowest potential with respect to that of the bell-shape housing and said spacer means.

* * * * *